COMBINED NAIL CLIPPER AND KNIFE

Original Filed Oct. 21, 1964

INVENTOR
JAMES B. RESWICK
BY
Hopgood & Calimafde
ATTORNEYS

United States Patent Office

Re. 26,344
Reissued Feb. 13, 1968

26,344

COMBINED NAIL CLIPPER AND KNIFE

James B. Reswick, Gates Mills, Ohio, assignor to The W. E. Bassett Company, Derby, Conn., a corporation of Connecticut Original No. 3,261,093, dated July 19, 1966, Ser. No. 405,339, Oct. 21, 1964. Application for reissue Oct. 14, 1966, Ser. No. 595,548
8 Claims. (Cl. 30—142)

Matter enclosed in heavy brackets [ ] appears in the original patent but forms no part of this reissue specification; matter printed in italics indicates the additions made by reissue.

*ABSTRACT OF THE DISCLOSURE*

*The invention contemplates an improved combined tool featuring a conventional lever-actuated nail clipper with a cutting-blade element pivotally secured thereto, in such manner that the cutting edge of said element is secured in a safe protected position when the tool is in inoperative condition, and in such manner that the cutting edge is positively referenced to the handle when the cutting-blade element is extended for use. The foregoing is achieved by relying upon relative proportions of the parts and their change of shape, as between conditions existing at the open and at the closed position of the clipper.*

My invention relates to a combined tool providing nail-clipper and cutting-blade functions.

It is an object of the invention to provide an improved device of the character indicated. Specifically, it is an object to provide such a device with safety features assuring against exposure of sharp edges when folded to inoperative position and positively referencing the cutting blade when extended for use. It is also an object to meet the foregoing objects with a tool of elemental simplicity and which is effective and foolproof in operation.

Other objects and various further features of novelty and invention will be pointed out or will occur to those skilled in the art from a reading of the following specification in conjunction with the accompanying drawings. In said drawings, which show, for illustrative purposes only, preferred forms of the invention.

Briefly stated, the invention contemplates an improved combined tool featuring a conventional lever-actuated nail clipper with a cutting-blade element pivotally secured thereto, in such manner that the cutting edge of said element is secured in a safe protected position when the tool is in inoperative condition, and in such manner that the cutting edge is positively referenced to the handle when the cutting-blade element is extended for use. The foregoing is achieved without in any way impairing nail-clipper functions or effectiveness and without requiring any change in formation of standard nail-clipper parts.

Referring to FIGS. 1 to 7 of the drawings, the invention is shown in application to a standard nail-clipper construction, which happens to be of the swingable, reversible-lever type, exemplified in Bassett Patent 2,477,-782. Thus, the illustrated clipper comprises opposed elongated jaw members 10–11 of stiffly yieldable material such as steel. Jaw members 10–11 are connected as by spot-welding at one end, and they diverge to provide normally spaced cutting jaws 12–13 at the other end. A headed pin or rivet 14 passes through aligned openings in the jaw members near the cutting jaws, and an actuating lever 15 is formed with a bridge 16 received in a slot 17 in the rivet 14, to hold the parts in assembled relation.

Figure 1:
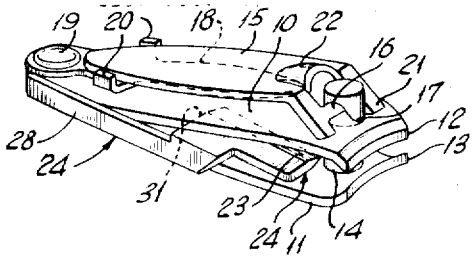
FIG. 1 is a view in perspective showing a preferred tool of the invention, the parts being folded into inoperative position.
Figure 2:
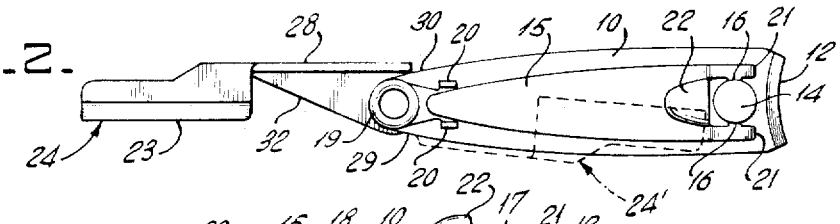
FIG. 2 is a plan view of the tool of FIG. 1, with the cutting blade swung to its extended or operative position.
Figure 3:
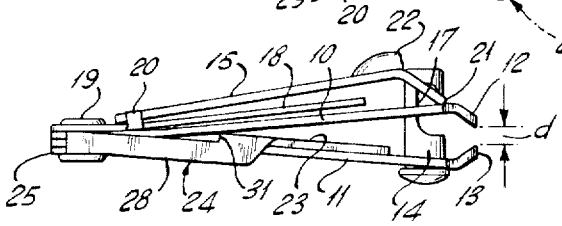
FIG. 3 is a side elevation of the tool of FIG. 1.

If desired, and as also shown in said patent, a file member 18 may be pivotally connected by an eyelet 19 to the connected end of the jaw members 10–11, file member 18 being formed with spaced upstanding lugs 20 to receive, locate and retain the free end of the lever 15 when folded as in the position shown in FIGS. 1 to 3. In this folded position, feet 21, which extend beyond bridge 16, engage jaw member 10 just beyond the longitudinal location at which bridge 16 engages rivet slot 17. Jaw members 10–11, when unstressed, are spread apart much more than when assembled; therefore, in the assembled condition, the resilient stress or preload on jaw members 10–11 is reflected via bridge 16 as a strong downward force to urge the free end of lever 15 against file member 18.

As noted above, layer 15 is of the swingable, reversible type, meaning that it must be reversed in order to perform its jaw-actuating function. This is done by raising lever 15 from the FIG. 1 position to the FIG. 4 position, and by then swinging the extended lever 180° about the axis of rivet 14. This operation brings a bulbous lobe or cam 22 into adjacency with the top or outer surface of the upper jaw member 10, so that subsequent lever depression cams the cutting jaws 12–13 together, in conventional fashion.

In accordance with the invention, I provide a cutting-blade function for the described clipper, without requiring any change of clipper parts. The cutting implement is shown as an elongated knife edge 23 formed at the cutting end of a blade element 24, having at its other end a hub 25, so that it may be pivotally secured by eyelet 19 to the outer surface of one of the jaw members 10–11; preferably, eyelet 19 is tightly set, so that a good measure of torsional friction characterizes the swinging action of both file 18 and blade member 24, each independently of the other. (In the form of FIGS. 1 to 7, blade member 24 is secured to jaw member 11, and in the form of FIGS. 8 and 9, blade member 24' is secured to jaw member 10.)

Figure 7:
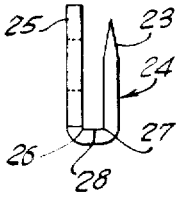
FIG. 7 is a left-end view of the element of FIG. 6.
Figure 5:
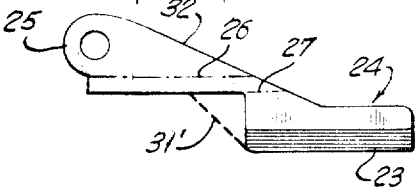
FIG. 5 is a plan view of the blank for the cutting-blade element of FIG. 1.
Figure 6:
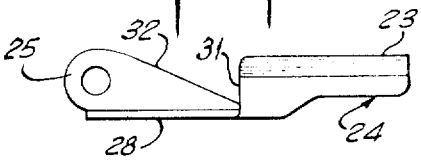
FIG. 6 is a plan view of the element of FIG. 5, after forming to its ultimate shape.

As best seen in FIGS. 5 to 7, the blade element 24 is formed from a flat blank, bent along creases 26–27 to define an elongated lateral offset 28, which assures that the blade 23 will be received in the space between jaw members 10–11 when in inoperative position. The offset 28 also serves a dual-stop function, limiting swinging movement of blade member 24 when moved to inoperative position, and limiting swinging movement of blade member 24 when moved to the extended or operative position (FIG. 2); at the first of these stop positions, offset 28 abuts the adjacent edge 29 of lower jaw member 11, and at the second of these stop positions, offset 28 abuts the opposite edge 30 of jaw member 11, in which case firm reference is established to the clipper body to enable the same to be an effective handle when cutting with edge 23.

Figure 4:
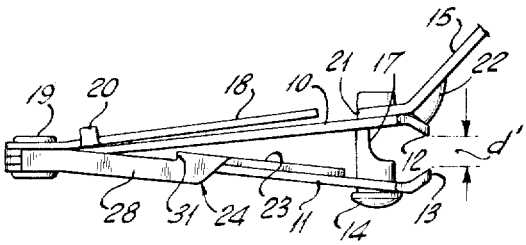
FIG. 4 is a view similar to FIG. 3 but showing the relation of parts when the jaw-actuating lever has been raised from inoperative position.

It is an important feature of the invention that means are provided for positive clamping retention of the blade member 24, when in inoperative position. This is accomplished by clamping the jaw members 10–11 against opposed faces of blade 23 when handle 15 is set into folded inoperative position (FIG. 3). In this connection, it will be noted that in the inoperative position (FIG. 3) the cutting edges of jaws 12–13 are spaced a distance d which is less than the distance d′ which applies when lever 15 is raised (FIG. 4). I so locate the heel region 31 of blade 23, in relation to the thickness of blade 23 and in relation to the varying spacing of jaw members 10–11 (as lever 15 is operated between the FIG. 3 and FIG. 4 positions) that the heel 31 will freely enter the space between jaw member 10–11 when lever 15 is in the FIG. 4 position, but such that on the other hand the FIG. 3 position will establish an interference upon attempted swinging entry of blade 23 into the space between jaw members 10–11. For this relationship, it will be understood that, if blade 23 is swung into closed position while lever 15 is raised (FIG. 4), then subsequent lowering of lever 15 to the FIG. 3 position will involve cammed clamping of jaw members 10–11 against the heel 31, assuring tight retention of the blade 23 when not in use. On the other hand, by raising lever 15 to the FIG. 4 position, the clamp action is relieved, and finger actuation against the offset 28 or against the extended hub edge 32 will easily bring the blade 23 into operative position.

As a further feature of the described embodiment, it will be noted that the structural relation of parts inherently permits effective retention of the blade in the event that the lever 15 has been lowered to its inoperative position (FIGS. 1 and 3) before the knife blade 24 is swung into its inoperative position. In this particular event, the heel 31 of the blade will interfere with the inner faces of the jaw members 10, 11 as the heel enters the space between these jaw members. Finger pressure applied to flange 28 in the direction of closing the blade 24 to its inoperative position will necessarily locally cam the jaw members 10, 11 slightly apart, thereby assuring positive frictional retention of the folded blade 24. It will be understood that the extent of slight jaw-spreading action achievable in this manner may be enhanced by slanting or tapering the heel 31 orientation in the direction of the hub as indicated by the heavy dashed line 31′ in FIG. 5.

Figure 9:
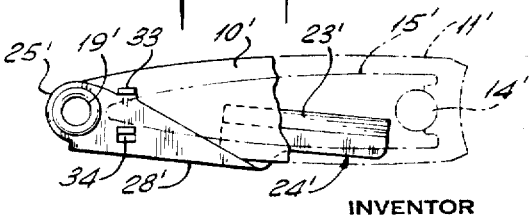
FIG. 9 is a plan view of the formed blank of FIG. 8, shown in assembled relation with parts of a clipper, parts of the latter being broken away and partly in phantom.
Figure 8:
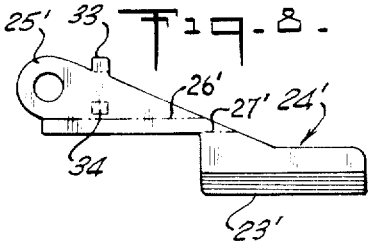
FIG. 8 is a plan view of the blank for a modified form of cutting-blade element.

In combined tools of the character indicated in which no file or equivalent member 18 is desired, I prefer the embodiment of FIGS. 8–9 which utilizes essentially the same blade member 24′ as described previously at 24. The blade member 24′ is shown with primed notation as to reference numerals which correspond with those already described for blade member 24. The blade member 24′ is fastened by eyelet 19 to the top surface of the upper jaw member 10 (there being no file member 15 in FIG. 9), and the offset 28′ positions blade 23′ for reception in the space between jaw members 10–11. In addition, for one location in the region of overlap between lever 15 and hub portion 25′, I provide locking means coacting between these overlapping elements. The locking means is shown as spaced lugs 33–34 struck up from and out of the body of hub portion 25′, the spacing being such as to receive and locate lever 15 when folded, as shown in FIG. 9. In this situation, it will be appreciated that the clamping action on blade 23′ not only holds blade 23′ firmly in place when lever 15 is in closed position but also the lugs 33–34 are thus firmly referenced to provide equally firm retention reference for lever 15.

*Quite aside from, and in certain cases independent of, the clamping action of jaws 10–11 on the heel of blade 23, the description of parts for FIGS. 3 and 4 is applicable to another aspect of the invention, wherein enhanced frictional of blade 23 (in closed position) results from the compressional displacement of jaws 10–11 as lever 15 is returned to the closed position of FIG. 3. This further aspect of the invention is important should fluctuations in manufacturing tolerances be such as to render negligible or non-existent the described binding or clamping action (between blade 23 and jaws 10–11).*

*According to this further aspect of the invention, the blade element 24 is initially formed with a bent contour (as viewed in side elevation) to substantially match or conform to the contour of jaw 11 when jaws 10–11 are in the less-stressed state (FIG. 4). Thus, in the unstressed assembled state of blade member 24, the blade portion 23 thereof lies flat against the inner surface of jaw 11, as shown in FIG. 4, while the hub 25 and its extension 40 (FIGS. 2, 5, 6) lie in close conformance with the jaw 11, in its more relaxed (FIG. 4) state. Upon moving lever 15 to its closed position (FIG. 3), jaw 11 is deflected as it is further compressed, and the deflection is resisted by blade 23, thus adding to the degree of frictional retention of blade 23, for the FIG. 3 situation. Stated in other words, the blade end of blade member 24 is in interference relation with adjacent jaw 11 upon swinging blade number 24 to closed position when lever 15 is in its lowered (closed) position (FIG. 3), thus assuring the described deflection resistance and frictional retention which is obtained when the lever 15 is lowered after blade member 24 has been swung to closed position.*

While I have described the invention in detail for the preferred forms illustrated, it will be understood that modifications may be made without departing from the scope of the invention as defined in the claims which follow.

I claim:

1. A combined tool, comprising opposed upper and lower elongated jaw members of stiffly yieldable material connected at one end and having normally spaced cutting jaws at the other end, a pivotally mounted operating lever for forcing the jaws together for a clipping operation and arranged to lie adjacent the top surface of the upper member when in inoperative position, said jaws being closer together when said lever is in inoperative position than when said lever is elevated into cutting position, and an elongtaed blade member having a hub end pivotally connected to the connected end of said jaw members on the outer surface of one of said jaw members, said blade member having a blade end associated with said hub end via a lateral offset portion, whereby in inoperative position said blade portion may be swung into and received in the space between said jaw members and whereby in operative position said blade member may extend in the direction away from said cutting jaws, the thickness of said blade member being such in relation to the spacing of unconnected portions of said jaw members that when said lever is in elevated position a clearance exists for swinging movement of said blade member between said jaw members and that when said lever is lowered to said inoperative position said jaw members compressionally engage a part of the blade end of said blade member to retain the same should it then be between said jaw members.

2. A tool according to claim 1, in which said blade end includes an elongated cutting edge facing in the direction away from said lateral offset portion, said offset portion being so located with respect to the blade pivot axis and to said cutting edge and to the adjacent edge of said one jaw member that in the inoperative position of said blade member said offset portion abuts said adjacent jaw-member edge to define a stop which assures against pivoting said blade member between said jaw members to such an extent that said cutting edge protrudes beyond the jaw-member edge opposite said adjacent edge.

3. A tool according to claim 2, in which said offset portion extends to a longitudinal position in proximity to the longitudinal location of the blade-pivot axis, whereby when said blade member is swung to its extended operative position said offset portion may interfere with the opposite jaw-member edge to define a stop so that said jaw members may constitute a firm handle during use of said cutting edge.

4. A tool according to claim 1, in which said blade-hub end is pivotally secured against the outer surface of the lower jaw member.

5. A tool according to claim 1, in which said blade-hub end is pivotally secured against the top surface of the upper jaw.

6. A tool according to claim 5, in which said blade member and said lever have overlapping regions when in their respective inoperative positions, and in which said blade member and said lever have interengaging locking elements at the overlapping regions, whereby jaw-clamped retention of said blade member additionally provides positive retention against accidental swinging dislodgement of said lever when in inoperative position.

*7. A combined tool, comprising opposed elongated jaw members of stiffly yieldable material connected at one end and having normally spaced cutting jaws at the other end, a pivotally mounted operating lever for forcing the jaws together for a clipping operation and arranged to lie adjacent the top surface of the upper member when in inoperative position, said jaws being closer together when said lever is in inoperative position than when said lever is elevated into cutting position, and an elongated blade member of stiffly yieldable material having a hub end pivotally connected to the connected end of said jaw members on the outer surface of a jaw member, said blade member having a blade end associated with said hub end via a lateral offset portion, whereby in inoperative position said blade portion may be swung into and received in the space between said jaw members and whereby in operative position said blade member may extend in the direction away from said cutting jaws, the blade end of said blade member conforming to the inner surface of one of said jaw members when said lever is in elevated position, whereby when said lever is lowered to said inoperative position said one jaw member compressionally engages a part of the blade end of said blade member to retain the same should it then be between said jaw members.*

*8. A combined tool, comprising opposed elongated jaw member of stiffly yieldable material connected at one end and having normally spaced cutting jaws at the other end, a pivotally mounted operating lever for forcing the jaws together for a clipping operation and arranged to lie adjacent the top surface of the upper member when in inoperative position, said jaws being closer together when said lever is in inoperative position than when said lever is elevated into cutting position, and an elongated blade member of stiffly yieldable material having a hub end pivotally connected to the connected end of said jaw members on the outer surface of a jaw member, said blade member having a blade end associated with said hub end via a lateral offset portion, whereby in inoperative position said blade member may be swung into and received in the space between said jaw members and whereby in operative position said blade member may extend in the direction away from said cutting jaws, the blade end of said blade member being in interference relation with one of said jaw members upon swinging said blade member to closed position when said lever is in its lowered inoperative position; whereby, upon first swinging said blade member to closed position when said lever is in its elevated position, and upon then lowering said lever to said inoperative position, said one jaw member compressionally engages a part of the blade end of said blade member to retain the same between said jaw members.*

References Cited

The following references, cited by the Examiner, are of record in the patented file of this patent or the original patent.

UNITED STATES PATENTS

| | | | |
|---|---|---|---|
| 612,990 | 10/1898 | Kiefaber | 30—28 X |
| 2,664,624 | 1/1954 | Bassett | 30—28 |
| 2,724,179 | 11/1955 | Baer | 30—143 |
| 2,999,505 | 9/1961 | Herstedt | 132—73.5 |
| 3,089,239 | 5/1963 | Loda | 30—28 X |
| 3,261,093 | 7/1966 | Reswick | 30—142 |

MILTON S. MEHR, *Primary Examiner.*